Aug. 21, 1928.

P. R. GLASS 1,681,229

FASTENER SETTING MACHINE

Filed May 14, 1921 5 Sheets-Sheet 1

INVENTOR.

Aug. 21, 1928.
P. R. GLASS
1,681,229
FASTENER SETTING MACHINE
Filed May 14, 1921  5 Sheets-Sheet 2
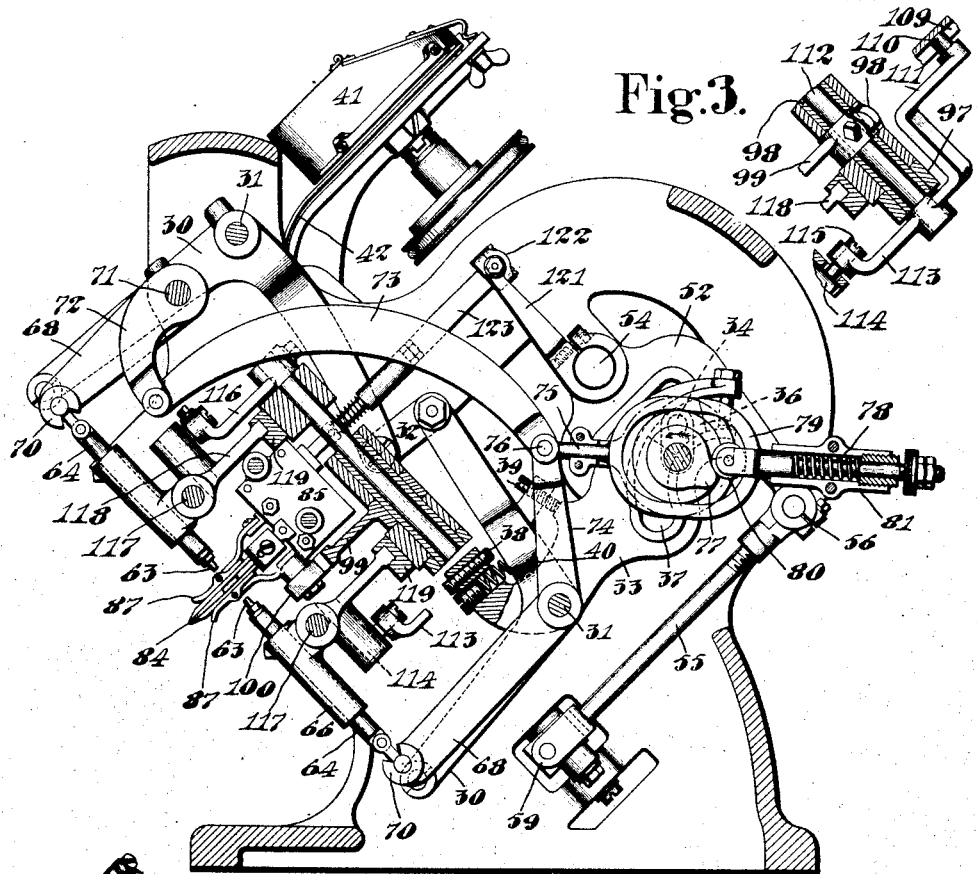
Fig. 3.
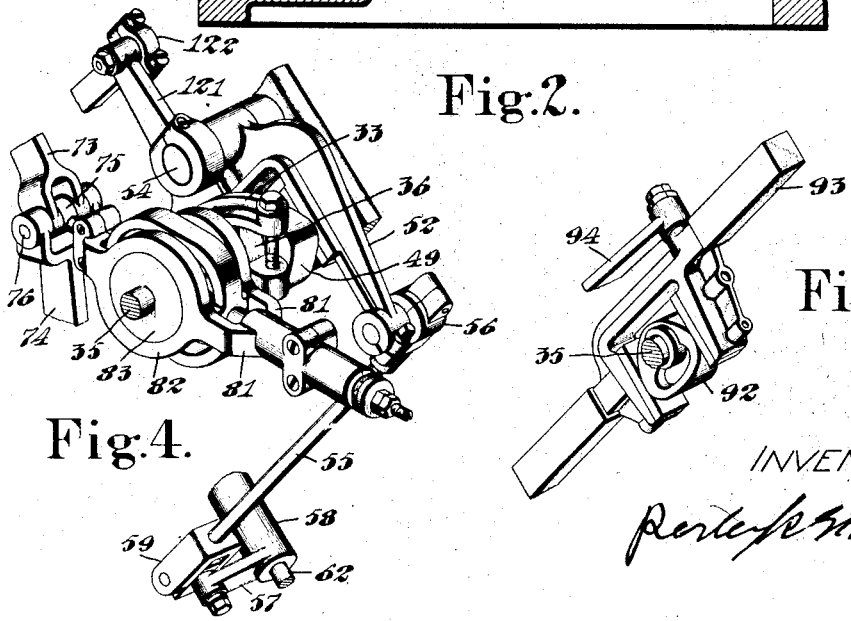
Fig. 2.
Fig. 4.
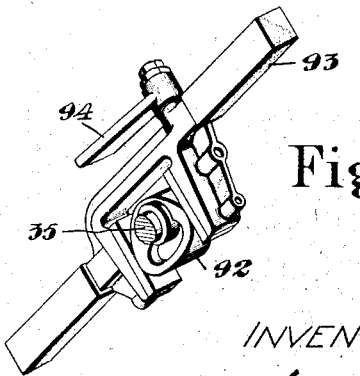
Fig. 5.
INVENTOR
Perley R. Glass

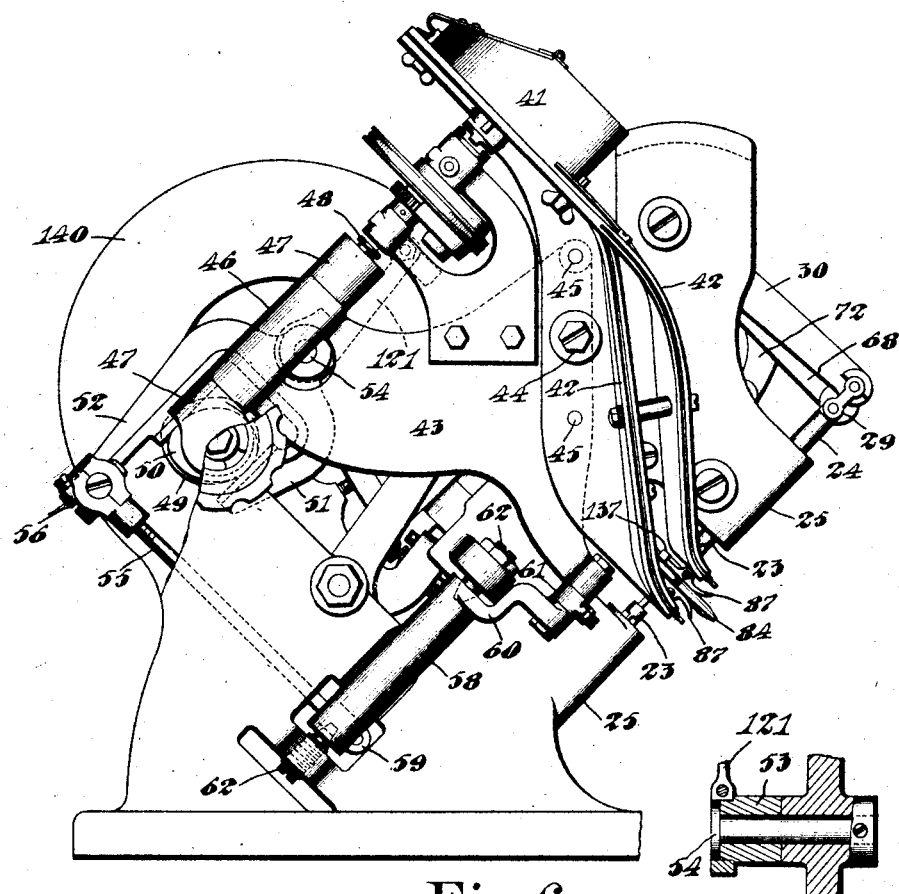
Fig.6.
Fig.19.
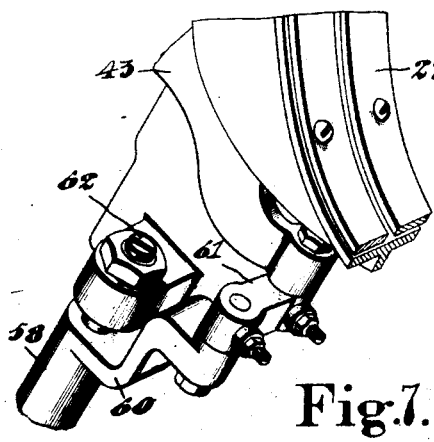
Fig.7.
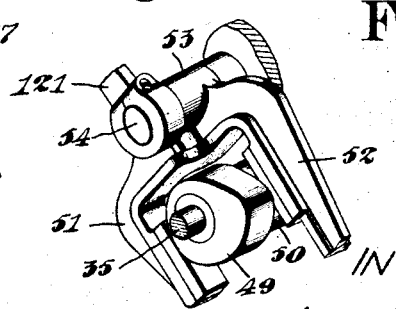
Fig.8.
INVENTOR

Aug. 21, 1928.

P. R. GLASS 1,681,229

FASTENER SETTING MACHINE

Filed May 14, 1921   5 Sheets-Sheet 4

INVENTOR.

Aug. 21, 1928.
P. R. GLASS
1,681,229
FASTENER SETTING MACHINE
Filed May 14, 1921  5 Sheets-Sheet 5
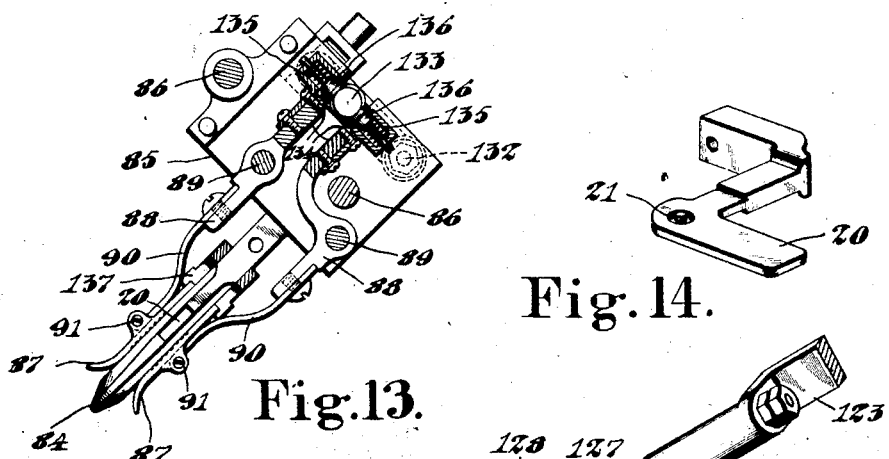
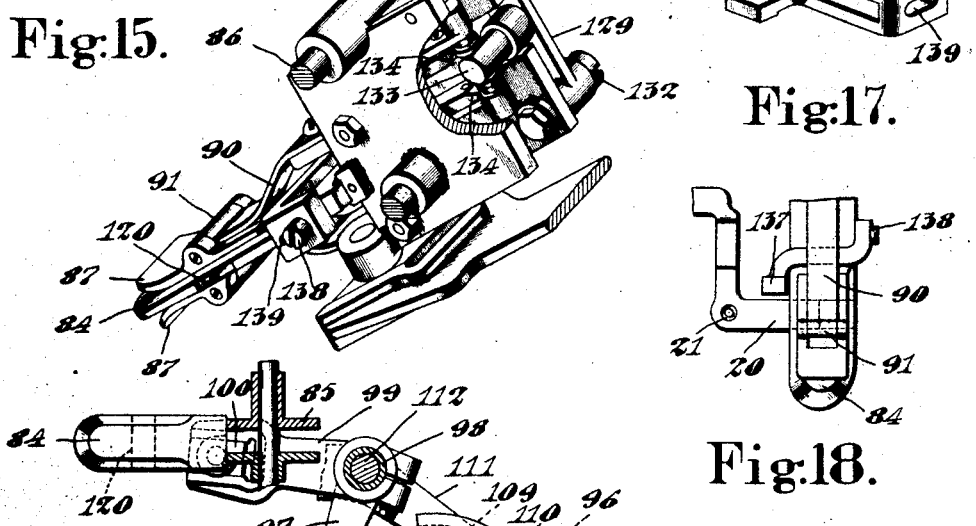
INVENTOR Patented Aug. 21, 1928.

1,681,229

UNITED STATES PATENT OFFICE.

PERLEY R. GLASS, OF WAYLAND, MASSACHUSETTS, ASSIGNOR TO UNITED SHOE MACHINERY CORPORATION, OF PATERSON, NEW JERSEY, A CORPORATION OF NEW JERSEY.

FASTENER-SETTING MACHINE.

Application filed May 14, 1921. Serial No. 469,666.

This invention relates to machines for setting fasteners, and, although not limited as to any one particular kind of fastener, it is shown and described as embodied in a construction particularly adapted to set eyelets in shoe-quarters. Moreover, the illustrated construction is what is known as a duplex machine, but some of the novel features hereinafter described and claimed are not dependent for their novelty upon embodiment in a duplex organization, and would be advantageous in fastener-setting machines of the single type.

One of the most objectionable features of fastener-setting machines in which the work is fed automatically is the vibration, and one of the principal sources of vibration is the work-feeding mechanism. This is more particularly objectionable in duplex machines because of the relatively great weight of the reciprocatory parts necessary to feed the work. In view of this condition an object of the present invention is to provide improved work-feeding mechanism so organized as to operate at high speed with a minimum of vibration.

In commercial duplex machines as heretofore constructed the fastener-setting tools have been used to feed the work, and to do so it has been necessary to impart a three-way movement to the entire laterally movable assemblage in which the setting tools are included. This assemblage comprises also the plungers by which the setting tools are carried, the punches and their plungers, and the bearings in which both sets of plungers are arranged to slide. When this assemblage is moved, first to shift the setting tools into register with the punched holes, again to feed the work, and finally to return the parts to their initial positions, the motions are necessarily productive of considerable vibration when the machine is operated at the required speed.

In accordance with one feature of the present invention the work is punched at one locality by one means and the fasteners are inserted by other means at another locality, the punched holes being transferred from the punching locality of the fastener-inserting locality without any lateral movement of either the punching means or the fastener-inserting means. Moreover, the punching means and the fastener-inserting means are relatively adjustable to vary the spacing of the punched holes, and the work-feeding mechanism is not only capable of being regulated to vary the length of the feeding steps but the means for effecting such regulation is arranged to effect a co-ordinate adjustment of the distance between the punching means and the fastener-inserting means, to the end that this distance will always be commensurate with the length of the feeding steps.

The illustrated work-feeding mechanism comprises cooperative work-clamping members which are reciprocated to impart feeding movement to the work. Some of the novel features embodied therein relate to the arrangement of the clamping members, others relate to the construction of said members, and still another relates to the relative timing of the feeding mechanism and the fastener-setting tools which causes the clamping members to feed the work in one direction and to take up slack in the work between feeding steps. So far as I am aware this is the first instance in which work clamping and feeding mechanism has been combined with fastener-inserting mechanism in such relation as to space successive fasteners and take up slack in the work between the fasteners, and I therefore believe myself entitled to broad protection for the invention in this as well as in other aspects above indicated.

In connection with the feature set forth in the last preceding paragraph another feature consists in controlling the clamping members of the feeding mechanism so as to produce relatively heavy clamping pressure during the feeding period and relatively light pressure during the period of recessional movement.

Another novel feature which, in one aspect, facilitates the aforesaid coordination of the setting mechanism and the work-feeding mechanism consists in improved means for transmitting motion from a continuously and uniformly driven crank to the inserting tool in such manner as to prolong the period during which the work is positively held by the inserting tool sufficiently to be coextensive with, if not more than co-extensive with, the period of recessional movement of the work-clamping members. For reasons that need not be fully accounted for here a crank arranged to work in a slotted lever has proved to be one of the most satisfactory forms of mechanism for actuating a fastener-setting tool because it exerts its maximum power and decelerates the travel of the setting tool during the final stages of the setting movement. The feature under consideration consists in lost-motion connections between a member illustrated as a slotted lever and the inserting tool and arranged to be effective after the tool has inserted a fastener in the work but before the fastener is acutally clenched. The illustrated connections are also effective during the first stages of motion of the lever in the opposite direction, thereby providing a dwell of the inserting tool in the work after clenching as well as one before clenching. The lost motion is normally taken up by a spring that permits the inserting tool to yield relatively to the operating lever during the stroke of the tool toward the work, thus providing a safeguard to prevent injury to the raceway in case of abnormal interference when, for example, the spindle and the leading eyelet in the raceway fail to register correctly or when, for any other reason, the travel of the inserting tool is hindered by the raceway. The same yielding connection also permits the inserting tool to yield while inserting the fastener into the work, thus affording sufficient time for the latter to adjust itself, if necessary, before the pressure on the fastener becomes positive.

Referring to the drawings,

Fig. 2 is a vertical section in a plane from front to rear, the front being at the left;

Fig. 3 is a vertical section, in a plane parallel to that of Fig. 2, through a part of the mechanism by which the punches are adjusted consistently with regulation of the work-feeding mechanism;

Fig. 4 is a perspective view of various actuators associated with the main shaft;

Fig. 5 is a perspective view of the actuator forming a part of the work-feeding mechanism;

Fig. 6 is an elevation of the machine from the opposite side relatively to that of Fig. 2, a portion at the left being broken away;

Fig. 7 is a perspective view including a portion of the lower raceway and connections for operating it;

Fig. 8 is a perspective view of cooperative cams and a lever actuated thereby to operate the raceways and the feed-clamps;

Fig. 13 is a perspective view of a hardened steel part comprising a duplex eyelet-clenching tool and a duplex punch-bed;

Fig. 14 is a vertical section in a plane from front to rear through the devices by which the quarters are clamped and fed, the point of view being the same as that of Fig. 2;

Fig. 15 is a perspective view including the structure shown in Fig. 14 and other elements;

Fig. 16 is a view looking down on the principal elements of the work-feeding mechanism;

Fig. 17 is a perspective view of a duplex edge-gage;

Fig. 18 is a plan view including the feeding jaws, the edge-gage and the punching and clenching plate; and Fig. 19 is a sectional view showing how the arm 121 is clamped upon the hub 53.

Figure 1:
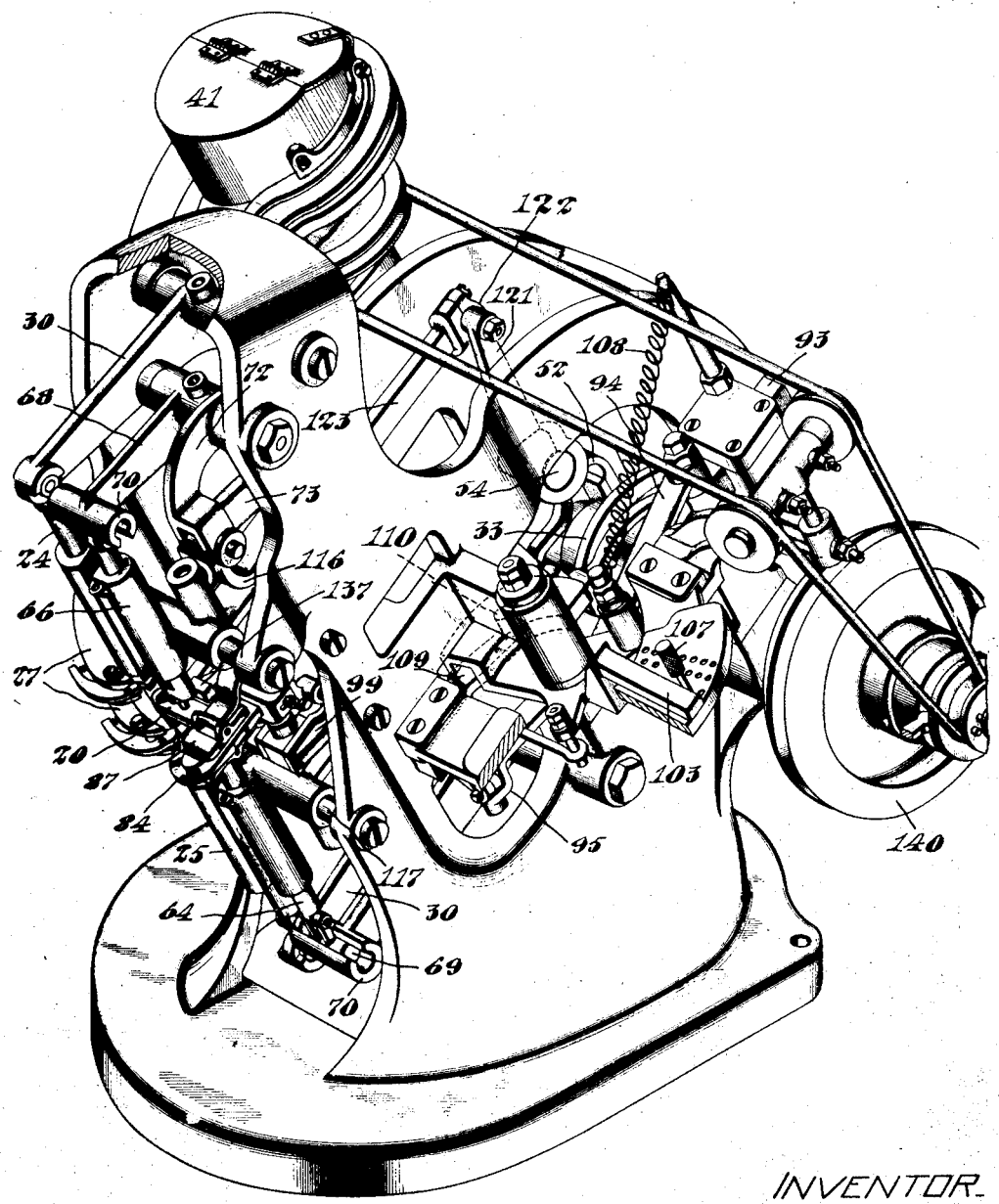
Fig. 1 is a perspective view of an eyeleting machine embodying the present invention.
Figure 9:
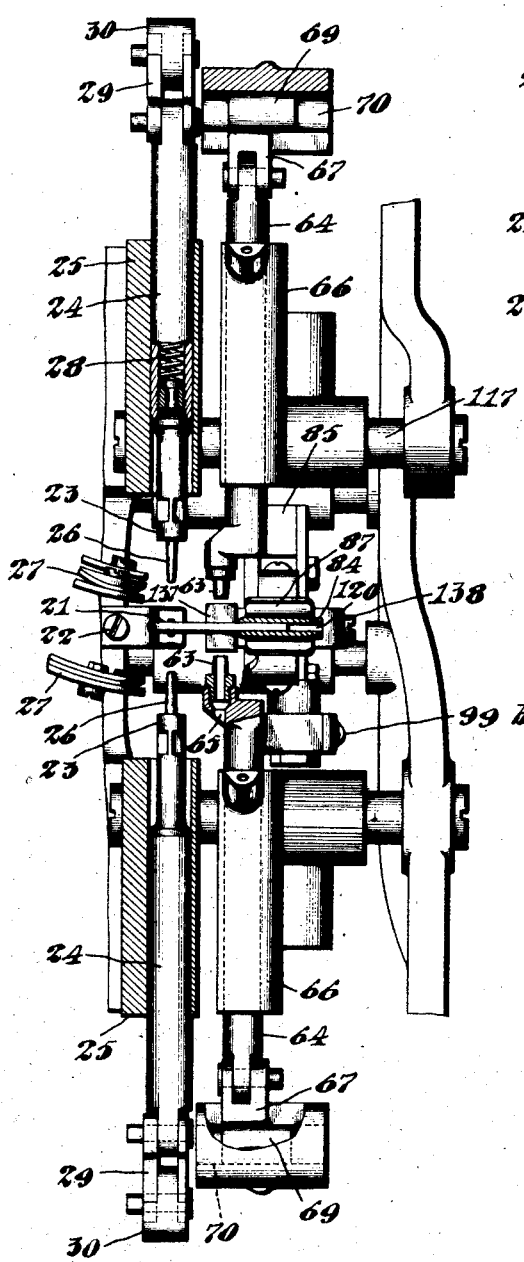
Fig. 9 is a front elevation, partly in section, including the punches, the eyelet-setting devices and parts adjacent thereto, the movable elements being in their initial positions.
Figure 12:
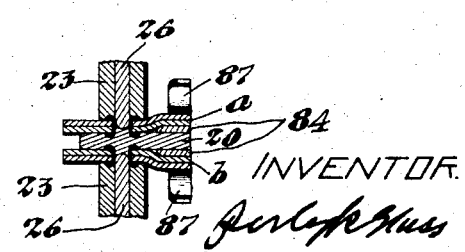
Fig. 12 is a section through the eyelet-setting devices which are shown in the act of completing a clenching operation.

The two quarters $a$ and $b$ of a shoe-upper, when in operative position in the machine, lie respectively above and below a thin hardened steel plate 20 (see Fig. 13) the right-hand portion of which serves as a duplex punch-bed and the left-hand portion of which is provided with duplex eyelet-clenching surfaces 21, one of which is shown in Fig. 14 and both of which are shown in Fig. 12. This member is affixed to the frame of the machine by a screw 22 as shown by Fig. 9 so that the clenching surfaces are in coaxial registration with two eyelet-inserting tools 23, 23. These tools are carried respectively by plungers 24, 24 arranged to slide in fixed bearings 25, 25 formed in the frame of the machine. The inserting tools are bored to contain the usual sliding spindles 26, 26 by which eyelets are taken from raceways 27, 27. The plungers are bored to contain compression springs such as that indicated at 28 in Fig. 9, said springs bearing against heads formed on the inner ends of the spindles as usual. The permanently fixed relation of the bearings 25 and the clenching surfaces 21 insures accurate registration of the eyelet-setting devices under all conditions.

Links 29 connect the plungers 24 to bell-crank levers 30, 30 the fulcrum pins of which are indicated at 31, 31. These two levers have arms extending toward each other, which arms are connected by a link 32 as shown by Fig. 3 so that they will move in unison. According to the present construction the upper lever receives its motion from the lower one, the latter being actuated by an arm 33 which transmits motion from a crank 34 carried by the main shaft 35. A segmental block 36 carried by the crank works in a segmental slot 37 in the arm 33. This construction causes a relatively slow and powerful clenching stroke and a relatively rapid return stroke of the inserting tools. The arm 33 rocks on the fulcrum pin 31 and transmits motion to the lower bell-crank 30 by means of set-screws 38 and 39. The set-screw 38 is carried by the arm 33 in position to abut against one arm of the lower bell-crank, but the set-screw 39 is carried by a lug on the bell-crank in position to abut against the arm 33. A compression spring 40 is contained in a socket formed in the arm 33 and bears against the bell-crank so as to take up lost motion between the upper arm and the bell-crank in such manner as to maintain set-screw 39 normally in contact with the operating arm. The working stroke of the inserting tools is transmitted by the set-screw 38 and consequently an adjustment of the latter will shift the limit of clenching motion of the inserting tools. When eyelets are to be set in relatively thin work set-screw 38 would be screwed in farther than for relatively thick work. The applied force of spring 40 is sufficient to move the inserting tools toward each other until the eyelets abut against the clenching surfaces 21, thereby providing a yielding inserting motion. But when the load is increased by the resistance of the eyelets to further advancement of the inserting tools the screw 38 takes up the lost motion and thereafter the motion of the inserting tools toward the clenching surfaces is positive. During the period including the actual clenching of the eyelets and the intervals of lost motion immediately preceding and following it the feed-clamps, hereinafter described, are released and returned to their initial position preparatory to the next step of feeding the work.

Eyelets are supplied by a hopper 41 from which they are conducted by raceways 42, 42 to the inserting tools respectively. The hopper and raceways are rigidly related to each other and are detachably fastened to an oscillatory carrier 43 by a bolt 44 and dowels 45. The carrier has a hinge 46 arranged between complemental hinge portions 47 formed on the frame of the machine. The hinge connection is completed by the hinge-pin 48. The delivery ends of the raceways are shifted to and from delivering position by mechanism now about to be described.

Referring to Fig. 8, the main shaft 35 carries two companion cams 49, 50 one of which acts on an arm 51 and the other on the arm 52 of a lever embodying the form of a yoke and arranged to straddle the shaft. The hub 53 of this lever is mounted on a fulcrum pin 54 anchored at one end and having a head at the other. The arm 52, which is longer than the arm 51 (see Figs. 2 and 6), has ball-and-socket connection with a link 55. This connection is indicated as a whole at 56. The link transmits motion to an arm 57 formed on a rocker 58, connection between the link and the arm being a convenient form of universal joint 59. Another arm 60 formed on the rocker is connected to the raceway carrier by a link 61. The ends of the body portion of the rocker are formed with conical cavities to receive conical fulcrum studs 62, 62.

Figure 10:
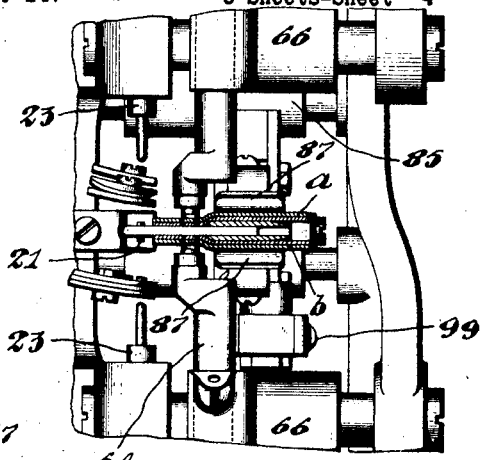
Fig. 10 is a view similar to Fig. 9, but of less scope, showing the punches in the act of punching holes in the two quarters of a shoe-upper.

Holes are punched in the quarters $a$ and $b$ for the reception of the eyelets by tubular punches 63, 63 which cooperate with the duplex punch-plate 20 as shown by Fig. 10. The punches are provided with screw shanks which are screwed into offset portions of plungers 64, 64, the offset portions being bored as indicated at 65 in Fig. 9 to discharge the punchings. The plungers 64 are arranged to slide toward and from each other in bearings afforded by horizontally adjustable blocks 66, 66. Links 67, 67 of novel construction transmit motion to the plungers from operating levers 68. These links have cylindric heads 69 arranged to slide axially in incomplete cylindric sockets 70 formed in the levers so as to maintain operative connection between the levers and the plungers and at the same time to permit the links to partake of horizontal adjustment by which the punches are set at the desired distance from the axis of the eyelet-setting devices. This construction enables the operating levers 68 to remain fixed with respect to such adjusting movement. The lower lever 68 is mounted on the fulcrum pin 31 hereinbefore identified but the upper lever 68 is mounted on a fulcrum pin 71 fastened to the main frame. An arm 72 forming an integral part of the lever 68 (see Fig. 2) is connected by a link 73 with an arm 74 that forms a part of the lower lever 68.

The punches are operated in unison by a plunger 75 embracing a pivot-pin 76 by which the link and arm are connected (see Fig. 4). The plunger 75 is operated by a cam 77 supplemented by a compression spring 78. The plunger includes a ring-shaped intermediate portion 79 which surrounds and clears the cam. The latter acts on a roll 80 carried by the plunger. The end portions of the plunger are arranged to slide in bearings afforded by a frame comprising two separable halves 81, 81. This divided construction is used to facilitate assembling. The middle portions 82 of the frame sections are annular and are fitted to collars or disks 83 carried by the shaft, the disks serving as a fulcrum on which the frame may rock but having no other effect. The plunger 75 is thus permitted to accommodate itself by slight angular motion to that of the arm 75. The punching motion is effected positively by the cam 77 while the return motion of the punches is due to reaction of the compression spring 78. The latter is contained in a socket formed in the divided frame 81, 81. The punch-plate being relatively thin and a considerable distance from its point of anchorage, may flex sufficiently to equalize the pressure of the two punches if necessary to compensate for slight variations.

It has been stated that the punches may be adjusted horizontally toward and from the axis of the eyelet-setting devices. Such adjustment will occur only when the work-feeding mechanism, hereinafter described, is regulated to increase or decrease the length of the feeding steps. The punches, however, play no part in the feeding of the work but remain a fixed distance from the eyelet-setting devices so long as the amplitude of feeding motion remains unchanged.

The machine is provided with a new and improved type of feeding mechanism comprising three cooperative clamping members one of which lies between the quarters $a$ and $b$ and the others of which cooperate therewith. The intermediate clamping member 84 (see Fig. 14) executes a two-way movement along the lines of feed. It is affixed to or otherwise made a part of a feed-carriage 85 arranged to slide in straight lines on guide-rods 86, 86. The relatively movable clamping members 87, 87 execute a four-way movement. They are carried by levers 88, 88 carried by the same carriage and mounted on fulcrum pins 89, 89. As shown in Figs. 3 and 13, the work-engaging portions of the clamping members 84 and 87 extend across the line in which the inserted fasteners are located and are therefore adapted to clamp the work at opposite sides of said line and counteract any tendency to distort or skew the fastener-receiving area of the work. The levers 88 include leaf-spring extensions 90, 90 the outer ends of which are fitted to the clamping members 87 so as to form hinges as indicated at 91, 91. These clamping members are thus enabled to accommodate themselves to the plane of the work irrespective of flexure of the spring portions 90, 90 and angular motion of the levers about the fulcrum pins 89. The feed-carriage 85 embodies a box-like construction (see Fig. 15) and the levers 88 are arranged between two confronting vertical walls thereof so as to cause the clamping members 87 to move in unison with the intermediate clamping member 84 when the feed-carriage is moved horizontally.

The mechanism for reciprocating the feed-carriage is substantially like the corresponding mechanism shown by Figs. 2 and 3 in United States Letters Patent 1,334,238 granted March 16, 1920 on an application filed by me. A brief description of this mechanism in connection with Figs. 5 and 16 of the present application will suffice for present purposes. Referring first to Fig. 5, an operating cam 92 carried by the shaft 35 reciprocates a plunger 93 positively in opposite directions. A link 94 transmits motion from this plunger to another link 95 with which it is connected by a pivot pin 96. The motion transmitted by link 95 is imparted to an arm 97 fastened to a hollow rock-shaft 98. Another arm 99 likewise affixed to the hollow shaft straddles and engages a block 100 pivotally connected to and carried by the feed-carriage. The amplitude of feeding motion thus transmitted may be varied by altering the path of motion described by the pivot pin 96. Accordingly a link 101 is provided to control and vary the motion of said pin. One end of this link embraces said pin while the other end is arranged to swing about a fulcrum pin 102. The latter is affixed to a feed-regulator 103 which is arranged to swing about a stationary fulcrum rod 104 only when a change is made in the length of the feeding steps. The regulator 103 plays over a stationary plate 105 having any desired number of holes 106 to receive a detachable pin 107. This pin serves as a stop against which the regulator is held by a tension spring 108. Whenever the amplitude of feeding motion is increased or decreased a corresponding change should be made in the location of the punches so that the distance between the axis of the punches and that of the setting devices will always be commensurate with the length of the feeding steps, to insure registration of the punched holes with the setting devices. It is for this reason that the bearing blocks 66, hereinbefore identified, are adjusted horizontally as aforesaid. The necessary adjustment of these bearing blocks occurs incidentally to every regulation of the feeding mechanism, and is produced by means about to be described.

The feed-regulator 103 (Figs. 3 and 16) is formed with a cam groove 109 to receive a stud 110 carried by an arm 111. This arm is affixed to a rock-shaft 112 journaled in the hollow rock-shaft 98. An arm 113 formed as an integral part of the arm 111 transmits adjusting motion to the bearing block 66 of the lower plunger 64, the connection between the arm and the bearing block embodying structural features such as to take care of the angular motion of the arm. The connection includes a cylindric plug 114 fitted in a socket in the bearing block so as to be capable of turning therein, and a screw stud 115 extending through the tip of the arm, through an opening in the bearing block and into the plug. A similar connection is provided for connecting the bearing block of the upper plunger with an arm 116 which is affixed to the upper end of the rockshaft 112 so that both bearing blocks will move in unison to partake of adjusting movement. The bearing blocks 66 are arranged to slide on stationary guide rods 117, 117 and are provided with flanges 118 arranged to slide in grooves formed in portions 119 of the main frame.

Figure 11:
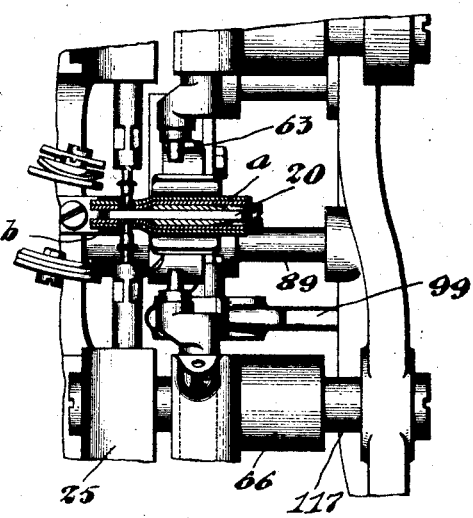
Fig. 11 shows a later stage of operation, the punches having been retracted, the work having been fed and the eyelet-inserting tools having taken eyelets from the raceways and being about to insert them in the quarters.

The intermediate clamping member 84 of the work-feeding mechanism is formed with a chamber 120 to receive the punch-plate 20 so as to form a mortise-and-tenon connection. The clamping members are thus enabled to clamp an area of each quarter that moves between the retracted punches as shown by Fig. 11, thereby covering temporarily the area of the punch-plate with which the punches coact. The clamping members initially clamp the work in the position shown by Fig. 10 close to but in advance of the punches.

The clamping motion of the members 87, 87 is derived from the mechanism that operates the raceway. Referring to Figs 2 and 4 an arm 121 having a split hub is clamped on the hub of the yoke lever 51, 52. A ball-and-socket joint 122 forms connection between the arm 121 and the link 123. This link is formed with an elongated bearing 124 for a plunger 125. A compression spring 126 under initial compression surrounds the plunger and is arranged between the bearing 124 and a collar 127 fastened to the plunger. A forked head 128 fastened to the plunger is connected to an arm 129 by a suitable form of universal joint comprising a block 130, carried by and pivotally connected to the arm 129 and also pivotally connected to the forked head by studs such as that indicated at 131 in Fig. 15. The arm 129 is carried by the feed-carriage 85 and is mounted on a pivot stud 132. A stud 133 carried by the arm 129 is arranged between the upper rear ends of the levers 88, 88 and acts simultaneously on cam surfaces 134, 134 formed on said levers. When the arm is fully retracted as shown by Figs. 14 and 15 the stud relieves the greater part of the pressure of the clamping members 87, 87 on the work but still maintains a light pressure to prevent the work from slipping out of place. The work-engaging faces of the members 87 are scored or grooved as shown by Fig. 13 as a further safeguard against slipping. Prior to each feeding motion, and while the clamping mechanism is in the position shown by Figs. 9 and 10, the arm 129 swings toward the front of the machine, the stud 133 thereby engaging the cam surfaces 134 to increase the clamping pressure of the work-engaging members 87. When the arm 129 is retracted the aforesaid relatively light pressure on the work is maintained by light compression springs 135, 135 contained in sockets at the rear ends of the levers 88 and arranged to act on followers 136, 136. The stud 133 therefore acts alternately on the cam surfaces 134 and the followers 136 to increase and decrease the clamping pressure against the quarters.

A duplex edge-gage 137 is arranged to guide the rear edges of the quarters. This gage is carried by the feed-carriage, being adjustably fastened to the intermediate work-clamping member 84 by a set-screw 138 (Fig. 15). The anchoring portion of the gage has a slot 139 to afford adjustment to the front and rear so that the eyelets will be set more or less closely to the guiding edges of the work.

The main shaft 35 is provided with a disconnectible clutch the driving member of which includes a pulley 140. This pulley is grooved to receive a driving belt which will be driven continuously. It will not be necessary for present purposes to illustrate or describe the details of construction of the clutch since the latter may be the same as that shown in the aforesaid Patent 1,334,238 and in other patents. It will be sufficient to state that the driving member of the clutch turns freely on the shaft until the clutch is tripped by a suitable controller such as a treadle, and that the clutch will continue to drive the shaft so long as the controller is held in operative position, and will interrupt driving connection only when the controller is released. The machine will then come to rest with the shaft at a predetermined point in its cycle corresponding to the positions of the parts shown by Figs. 2 and 9.

When using the machine the operator will insert the two quarters of a shoe between the intermediate clamping member 84 and the clamping members 87 respectively, the forward ends of these members being suitably beveled to facilitate inserting the work in a direction from front to rear. Although the clamping members 87 are initially under clamping pressure maintained by the springs 135 this pressure is relatively light and does not hinder the insertion of the work. When the guiding edges of the quarters have been inserted so far as to touch the edge gage 137 and the quarters are registered relatively to the punches the machine may be started. The stopping of the machine interrupts three principal motions, viz., the retractory motion of the inserting tools 23, the advancing motion of the delivery ends of the raceways to delivering position, and the clamp-tightening motion of the arm 129. These three motions are therefore resumed immediately when the machine is started, and the punching motion of the punches 63 begins at about the same time so that the tightening of the clamping members 87 is completed while the punches are functioning. The latter are retracted immediately after they have punched holes through the quarters, thereby clearing the way for the feed motion of the clamping and feeding members 84, 87, 87. By this time the delivery ends of the raceways have moved into registration with the inserting tools and the latter have completed their retractory movement. While the feed is taking place the inserting tools advance to pick eyelets from the raceways and then the raceways are retracted to clear them. During the latter stages of retracting the raceways and after the feeding motion is completed the clamping pressure of the members 87 is decreased, this occurring while the eyelets are going through the quarters but before they are actually clenched. It is to be remembered that the lost motion provided by the set-screws 38, 39 (Fig. 2) interrupts the advancing movement of the inserting tools between the insertion of the eyelets and the clenching thereof and that a corresponding lost motion occurs after the clenching has been completed. During the period that includes these two intervals of lost motion and the intervening clenching motion the feed-carriage is returned to its initial position, and although the clamping members still maintain a light clamping pressure on the work it has no effect excepting to smooth out wrinkles and take up slack in the work, because the work at that time is held positively by the inserted eyelets which are interlocked with the spindles 26 and with the central projections of the clenching elements 21. The retraction of the inserting tools is the last motion of the cycle but this does not begin until after the return motion of the feed-carriage has been completed. The clamping members 84, 87, 87, having come to rest in the position shown by Fig. 9 before the work is released by the inserting tools, hold the work in the desired position for the next punching operation as the beginning of the next cycle.

Having thus described my invention, what I claim as new and desire to secure by Letters Patent of the United States is:

1. A fastener-setting machine comprising a fixed duplex clenching tool, two fastener-inserting tools arranged in duplex relation to cooperate with said clenching tool, means for punching holes in two work elements in confronting relation, and duplex work-feeding mechanism for transferring the punched holes from the punching locality to the fastener-setting locality.

2. A fastener-setting machine comprising two fixed bearings in coaxial relation, duplex setting mechanism including inserting tools arranged to slide in said fixed bearings, and a fixed duplex clenching tool arranged to cooperate with said inserting tools, duplex punching mechanism including punches for making holes simultaneously in two shoe-quarters in confronting relation, and means for feeding said quarters to transfer the punched holes from registration with the punches to the fastener-setting locality.

3. A fastener-setting machine comprising duplex punching mechanism including two punching tools, duplex fastener-setting mechanism including fastener-inserting tools separate from said punches, and mechanism for feeding two confronting work elements relatively to said punches and said tools.

4. A fastener-setting machine comprising duplex work-feeding mechanism the work-engaging elements of which execute reciprocatory motion, duplex fastener-setting mechanism the fastener-engaging tools of which are separate from said work-engaging elements, and duplex punching mechanism including punches spaced from said tools a distance commensurate with the range of said reciprocatory motion.

5. A fastener-setting machine comprising fastener-setting mechanism including a fastener-inserting tool, punching mechanism including a reciprocatory punch, stationary bearings for said punch and tool respectively, one of said bearings being adjustable laterally to vary the distance between the punching locality and the setting locality, regulatable mechanism arranged to feed the work with steps of variable amplitude, and means operable by regulating movement of said feeding means to maintain the distance between said bearings commensurate with the amplitude of the feeding steps.

6. A fastener-setting machine comprising duplex punching mechanism including punches arranged to remain in registration with a punching locality, duplex fastener-setting tools fixed against lateral movement, and means for feeding duplex work to transfer the punched holes from said punching locality to registration with said setting tools.

7. A fastener-setting machine comprising two fixed bearings one of which is adjustable toward and from the other, a fastener-setting tool and a punch arranged to slide in said bearings respectively, mechanism for feeding the work relatively to said punch and said tool, a regulator arranged to adjust said feeding mechanism to vary the length of the feeding steps, and means operated by said regulator to maintain the distance between said fastener-inserting tool and said punch commensurate with the length of the feeding steps.

8. A fastener-setting machine comprising fastener-setting mechanism including a fixed bearing and cooperating setting tools one of which is arranged to slide in said bearing and the other of which is arranged to remain permanently in registration therewith, work-feeding mechanism including work-clamping means and regulatable means for imparting feeding motion of variable amplitude thereto, work-punching mechanism including fixed guiding means, a bearing block held thereby, and a punch arranged to slide in said bearing block, and means for communicating regulating movement of said feeding mechanism to said bearing block so as to space said punch from the setting locality by a distance commensurate with the length of feeding motion.

9. A fastener-inserting machine comprising an inserting tool arranged to function at one locality, a punch arranged to function at another locality, regulatable work-feeding mechanism including cooperative work-clamping members movable in unison to transfer the punched hole in the work from the punching locality to the fastener-inserting locality, said punch and said feeding mechanism being so organized and connected that regulations of the latter effect corresponding lateral adjustments of the punch.

10. A fastener-setting machine comprising punching mechanism arranged to function at one locality, fastener-setting mechanism arranged to function at another locality, said mechanisms being relatively adjustable to vary the distance between said localities, mechanism for feeding the work relatively to said punching mechanism and said setting mechanism, and means for simultaneously regulating said feeding mechanism and the effective spaced relation of said punching mechanism and said setting mechanism so that said spaced relation will always be commensurate with the length of the feeding steps.

11. A fastener-setting machine comprising work-clamping means constructed and arranged to maintain clamping pressure continuously, means arranged to reciprocate said clamping means so as to feed the work edgewise, means arranged to punch a hole in the work while said clamping means is at one limit of its feeding movement, and fastener-setting mechanism arranged to set a fastener in the work while said clamping means is at the other limit of said feeding movement and to hold the work against moving with said clamping means while the latter is returning to the first said limit of its feeding movement.

12. A fastener-inserting machine comprising a laterally adjustable punch, cooperative fastener-setting tools fixed against lateral movement, regulatable work-feeding mechanism arranged to transfer the punched hole from registration with said punch to registration with said tools, and means arranged to communicate regulating movement of said work-feeding means to said punch so as to space the latter from said tools commensurately with the amplitude of feeding motion.

13. A fastener-inserting machine comprising cooperative fastener-setting tools, cooperative work-clamping members, mechanism arranged to reciprocate said clamping members toward and from said tools to feed the work, and means arranged to punch a fastener-receiving hole in the work between the clamped area and the setting locality.

14. A fastener-setting machine comprising cooperative setting tools, cooperative punching members arranged to punch a fastener-receiving hole in the work apart from the setting locality, and work-feeding mechanism including work-clamping members movable toward and from the setting locality so as to pass between said punching members.

15. A fastener-setting machine comprising cooperative setting tools, and work-feeding mechanism including cooperative reciprocatory clamping and feeding members movable to space successive fasteners and arranged to clamp successive areas of the work in advance of and at opposite sides of the line of inserted fasteners.

16. A fastener-setting machine comprising punching mechanism, work-feeding mechanism and fastener-setting mechanism organized to perform the punching, feeding and setting operations in the order recited, said feeding mechanism being effective to tension the work while the latter is held by the setting mechanism.

17. A fastener-setting machine comprising setting mechanism including cooperative setting tools, and work-feeding mechanism including cooperative reciprocatory clamping and feeding members movable toward and from the setting locality in advance of the latter and controlled to execute its recessional movement while the work is held positively by said tools and to clamp the work during the latter stages of said recessional movement so as to take up slack in the work.

18. A fastener-setting machine comprising setting mechanism including cooperative setting tools, and work-feeding mechanism including cooperative reciprocatory clamping and feeding members movable toward and from the setting locality in advance of the latter and controlled to maintain continuous clamping of the work, said setting tools being controlled to maintain a hold on the work for a period of time coextensive with the period of the recessional movement of said clamping and feeding members.

19. A fastener-setting machine comprising setting mechanism including cooperative setting tools, and work-feeding mechanism including cooperative reciprocatory clamping and feeding members movable toward and from the setting locality in advance of the latter, and means for controlling said members so as to maintain relatively heavy clamping pressure during the feeding motion and to exert relatively light clamping pressure during the recessional movement, said setting members being controlled to hold the work throughout the period of said recessional movement.

20. A fastener-inserting machine comprising a frame, a fastener-inserting tool fitted to slide in a bearing in said frame, an adjustable member mounted on said frame, a punch fitted to slide in a bearing in said member, mechanism arranged to feed the work relatively to said fastener-inserting tool and said punch, and means arranged to adjust said member and said feeding mechanism to vary the distance between said punch and said inserting tool and to maintain the length of the feeding steps commensurate with the distance between said tool and said punch.

21. A fastener-inserting machine comprising duplex fastener-inserting mechanism, and duplex work-feeding mechanism including three cooperative work-clamping members arranged and operated to feed two confronting work elements, said members being movable toward the fastener-inserting locality while feeding the work.

22. A fastener-inserting machine comprising mechanism for punching a hole in the work at one locality, mechanism for inserting a fastener in said hole at another locality, and work-feeding mechanism including cooperative work-clamping members movable from said punching locality toward said other locality while feeding the work.

23. A fastener-setting machine comprising fastener-setting mechanism, punching mechanism including a punch-bed and a punch arranged to cooperate therewith, and work-feeding mechanism including cooperative reciprocatory members arranged to clamp and feed the work, one of said members being arranged to brace said punch-bed against the punching stress of said punch.

24. A fastener-setting machine comprising fastener-setting mechanism including a stationary clenching tool having a laterally extending portion forming a punch-bed, punching mechanism including a punch arranged to cooperate with said punch-bed, and work-feeding mechanism including a feeding member arranged to brace said punch-bed against the stress of said punch.

25. A fastener-setting machine comprising fastener-setting mechanism including a stationary clenching tool having a laterally extending portion forming a punch-bed, punching mechanism including a punch arranged to cooperate with said punch-bed, and work-feeding mechanism including cooperative clamping and feeding members movable toward and from the fastener-setting locality, one of said feeding members being arranged to brace said punch-bed against the stress of said punch.

26. A fastener-setting machine comprising fastener-setting mechanism, and work-feeding mechanism including a reciprocatory feed-carriage, cooperative work-clamping members carried thereby, a controller carried by said feed-carriage to control the clamping action of said clamping members, and means for moving said controller relatively to said carriage so as to cause it to exercise controlling action over said clamping members.

27. A fastener-setting machine comprising duplex fastener-setting mechanism arranged to set fasteners simultaneously in two shoe-quarters occupying confronting relation, and work-feeding mechanism including cooperative members arranged and controlled to clamp the quarters continuously, said members being movable toward and from the setting locality while clamping, and said setting mechanism being timed to hold the work against moving with the recessional movement of said members from said locality.

28. A fastener-setting machine comprising duplex fastener-setting mechanism arranged to set fasteners simultaneously in two shoe-quarters occupying confronting relation, work-clamping members arranged to clamp the quarters separately, and mechanism arranged to move said clamping members in unison toward and from the setting locality, said setting mechanism being controlled to hold the quarters stationary while said clamping members move away from said locality, so as to insure one-way movement of the work.

29. A fastener-setting machine comprising duplex fastener-setting mechanism the setting tools of which are fixed permanently in alinement with each other and arranged to set the fasteners simultaneously in two shoe-quarters in confronting relation, and work-feeding mechanism including work-clamping members movable toward and from the setting locality in unison, said setting tools being controlled to hold the quarters stationary while said clamping members move away from said locality, so as to insure one-way movement of the work.

30. A fastener-setting machine comprising duplex fastener-setting mechanism the setting tools of which are arranged to set the fasteners simultaneously in two shoe-quarters in confronting relation, duplex punching mechanism including a punch-bed arranged to function between the quarters, and work-feeding mechanism including cooperative work-clamping members one of which is arranged to function between the quarters so as to act on both the latter, said punch-bed and the specified one of said clamping members having mortise-and-tenon portions such that said member may slide on the punch-bed toward and from the setting locality.

31. A fastener-setting machine comprising duplex fastener-setting mechanism including fastener-inserting tools and a duplex clenching tool, duplex punching mechanism including punches and a duplex punch-bed, and duplex work-clamping mechanism including a duplex clamping member and relatively movable clamping members arranged to cooperate therewith to clamp the quarters separately, said clenching tool, said punch-bed and said duplex clamping member being arranged to function between two shoe-quarters in confronting relation, said punch-bed and said duplex clamping member having mortise-and-tenon connection such as to permit relative movement for feeding the work, and mechanism for causing relative movement of said tools and said clamping members to feed the work.

32. An eyeleting machine comprising duplex punching mechanism, duplex work-feeding mechanism and duplex eyelet-setting mechanism organized to perform the punching, feeding and setting operations in the order recited on two confronting work elements, said feeding mechanism being movable to tension both of said work elements while they are held by the setting mechanism.

33. A fastener-setting machine comprising duplex fastener-setting mechanism arranged to set fasteners simultaneously in two shoe-quarters in confronting relation, and duplex work-feeding mechanism including clamping and feeding members one of which is arranged to function between said quarters so as to clamp them simultaneously, said members being arranged to execute rectilinear feeding movement, and means for reciprocating said members so as to feed the work.

34. A fastener-setting machine comprising fastener-setting mechanism, and work-feeding mechanism including a flexible resilient arm, a work-engaging member carried by and pivotally connected to said arm so as to rock relatively thereto, a work-engaging member arranged to cooperate with that first mentioned to clamp an article of work between them, and means for reciprocating said work-engaging members in unison so as to feed the work.

35. A fastener-setting machine comprising duplex fastener-setting mechanism including tools arranged to set fasteners simultaneously in two shoe-quarters in confronting relation, and duplex work-feeding mechanism including two flexible resilient arms, work-engaging members carried respectively by and pivotally connected to said arms so as to bear on the outer faces of said quarters, a work-engaging member arranged to function between the quarters so as to clamp the latter conjointly with the first said members respectively, and means for reciprocating said work-engaging members in unison to feed the work.

36. A fastener-setting machine comprising duplex fastener-setting mechanism including setting tools arranged to set fasteners simultaneously in two shoe-quarters in confronting relation, duplex work-feeding mechanism including cooperative clamping and feeding members movable in unison toward and from the setting locality, one of said clamping and feeding members being arranged to function between the quarters, and duplex punching mechanism including punches and a duplex punch-bed arranged to punch holes in the quarters at points within the range of feeding movement of said clamping and feeding members, said punch-bed being arranged to function between the quarters.

37. A fastener-setting machine comprising fastener-setting mechanism, a movable raceway arranged to supply fasteners thereto, work-feeding mechanism including cooperative work-clamping members movable toward and from the setting locality, a reciprocatory actuator, and operating connections from the latter to said raceway and to said clamping members for controlling the delivery of fasteners and the clamping of the work in conjunction with each other.

38. A fastener-setting machine comprising fastener-setting mechanism, a movable raceway for supplying fasteners thereto, work-clamping members arranged to execute work-feeding movement, mechanism including a reciprocatory member for operating said raceway, and means operable by said reciprocatory member to control the clamping action of said members.

39. A fastener-setting machine comprising fastener-setting mechanism, a movable raceway for supplying fasteners thereto, work-clamping means arranged to maintain continuous clamping pressure on the work, means for reciprocating said clamping means to feed the work, mechanism including a reciprocatory member for operating said raceway, and means operable by said reciprocatory member to regulate the clamping action of said clamping means.

40. A fastener-setting machine comprising fastener-setting mechanism, a movable raceway for supplying fasteners thereto, mechanism including a reciprocatory member for operating said raceway, work-clamping means, mechanism for reciprocating said clamping means to feed the work, and lost-motion connections operable by said reciprocatory member to control the clamping action of said clamping means.

41. A fastener-setting machine comprising fastener-setting mechanism, work-feeding mechanism, and punching mechanism including a punch, a cam-shaft, a frame arranged to rock on the latter, a plunger arranged to slide in said frame, a cam carried by said shaft and arranged to actuate said plunger, and means arranged to transmit longitudinal motion of said plunger to said punch.

42. A fastener-setting machine comprising a tool for punching a hole in the work, a tool for inserting a fastener in said hole, a cam-shaft, a frame arranged to rock on said shaft, a plunger arranged to slide in said frame, a cam carried by said shaft and arranged to actuate said plunger, and means for transmitting longitudinal motion of said plunger to one of said tools.

43. A fastener-setting machine comprising a tool for punching a hole in the work, a tool for inserting a fastener in said hole, a lever arranged to impart motion to one of said tools, a rotary cam, a plunger arranged to transmit motion from said cam to said lever, and a frame for guiding said plunger, said frame and plunger being arranged to rock about the axis of said cam so as to partake of the angular motion of said lever.

44. A fastener-setting machine comprising punching mechanism, work-feeding mechanism and fastener-setting mechanism organized to perform the punching, feeding and setting operations in the order recited, the work-engaging elements of said feeding mechanism being movable toward the setting locality while feeding the work.

45. In a duplex fastener-inserting machine, duplex work-feeding mechanism comprising three cooperative clamping jaws arranged to clamp and feed two confronting portions of the work separately, and a duplex edge-gage fastened to the intermediate one of said jaws and having portions arranged to engage said confronting portions respectively.

46. In a duplex fastener-inserting machine, duplex work-feeding mechanism comprising three cooperative clamping jaws arranged to clamp and feed two confronting portions of the work separately, and a duplex edge-gage fastened to the intermediate one of said jaws by a single screw and having portions arranged to straddle said intermediate jaw so as to be braced by the latter against turning about said screw.

47. In a duplex fastener-inserting machine, duplex work-feeding mechanism comprising three cooperative clamping jaws arranged to clamp and feed two confronting portions of the work separately, a duplex edge-gage formed and arranged to straddle the intermediate one of said jaws so that its branches may engage said confronting portions respectively, and means for clamping said gage adjustably to said intermediate jaw.

48. A fastener-setting machine comprising duplex fastener-setting mechanism arranged to operate on two confronting articles of work, duplex work-feeding mechanism including a member arranged to function between said confronting articles, and a duplex edge-gage carried by said member and comprising confronting portions arranged to straddle said member and engage the articles of work respectively.

49. A machine comprising mechanism for performing a series of operations upon an article of work, and work-feeding mechanism including a reciprocatory carriage, two work-clamping members carried by said carriage and arranged to be movable toward and from each other and having confronting cam surfaces, a controller arranged to act on said cam surfaces at once, and mechanism for imparting operative movement to said controller.

50. A machine comprising mechanism for performing a series of operations upon an article of work, and work-feeding mechanism including a reciprocatory carriage, two work-clamping members carried by said carriage and arranged to be movable toward and from each other, said clamping members having confronting cam surfaces and confronting spring-stressed elements, a controller arranged to act on said cam surfaces at once and on said spring-stressed elements at once, and mechanism for causing said controller to act on said cam surfaces and on said spring-stressed elements alternately.

51. A fastener-inserting machine comprising fastener-inserting mechanism and work-feeding mechanism, said two mechanisms being organized to engage the work simultaneously at separate points and automatically to tension that portion of the work between said points.

52. A fastener-inserting machine comprising fastener-inserting mechanism, and work-feeding mechanism the work-engaging elements of which are constructed and arranged to clamp the work, said mechanisms being organized to take up slack in the work while said elements are moving in one direction, and said elements being movable to feed the work step by step in the opposite direction to space the fasteners.

53. A fastener-inserting machine comprising fastener-inserting mechanism, mechanism for punching holes successively in the work to receive the fasteners, and work-feeding mechanism by which the work is fed relatively to said punching mechanism, said work-feeding mechanism and said fastening-inserting mechanism being organized to take up slack in the work between each inserted fastener and the point where the next succeeding hole is about to be punched by said punching mechanism.

54. A fastener-inserting machine comprising fastener-inserting mechanism and work-feeding mechanism organized to space the fasteners one from another and take up slack in the work between each inserted fastener and that point where the next succeeding fastener is about to be inserted.

55. An eyeletting machine comprising eyelet-setting mechanism having a period of dwell after the setting tools have relieved their pressure on the clenched eyelet but before they have separated far enough to release said eyelet, and work-feeding mechanism including work-clamping members movable toward the eyelet-setting locality to feed the work and movable in the opposite direction during said period of dwell.

56. A fastener-inserting machine comprising fastener-inserting mechanism, and mechanism including work-clamping members movable to impart feeding movement to the work, said fastener-inserting mechanism including a work-engaging member having mortise-and-tenon connection with one of said clamping members.

57. A fastener-inserting machine comprising fastener-inserting mechanism, punching mechanism, and mechanism including work-clamping members movable to impart feeding movement to the work, said punching mechanism including a work-engaging member having a mortise-and-tenon connection with one of said clamping members.

58. A fastener-inserting machine comprising punching mechanism and fastener-inserting mechanism including a stationary work-engaging member, and work-feeding mechanism including co-operative work-clamping and feeding members one of which has mortise-and-tenon connection with said work-engaging member.

59. A fastener-inserting machine comprising fastener-inserting means and work-punching means arranged side by side, and work-feeding mechanism including two co-operative work-engaging members one of which executes a two-way movement and the other a four-way movement whereby the work is periodically clamped and fed to transfer the punched hole from the punching locality to the fastener-inserting locality.

60. A fastener-inserting machine comprising fastener-inserting means and work-punching means arranged side by side, and work-feeding mechanism including a member arranged to support the work and a member arranged to clamp the work periodically against the first said member, both of said members being movable laterally to transfer the punched hole from the punching locality to the fastener-inserting locality.

In testimony whereof I have signed my name to this specification.

PERLEY R. GLASS.